(12) United States Patent
Yamazaki et al.

(10) Patent No.: US 6,727,201 B2
(45) Date of Patent: Apr. 27, 2004

(54) SLURRY FOR CARRYING ZEOLITE AND METHOD FOR MANUFACTURING ZEOLITE-CARRYING ADSORPTION ELEMENT

(75) Inventors: Teruzi Yamazaki, Yokohama (JP); Jun Shimada, Yokohama (JP)

(73) Assignee: Nichias Co., Ltd., Tokyo (JP)

( * ) Notice: Subject to any disclaimer, the term of this patent is extended or adjusted under 35 U.S.C. 154(b) by 44 days.

(21) Appl. No.: 09/961,094

(22) Filed: Sep. 24, 2001

(65) Prior Publication Data

US 2002/0061812 A1 May 23, 2002

(30) Foreign Application Priority Data

Sep. 26, 2000 (JP) ......................................... 2000-291733

(51) Int. Cl.$^7$ ............................ B01J 29/04; B01J 29/06; B01J 21/04
(52) U.S. Cl. ..................... 502/64; 502/527.12; 502/439
(58) Field of Search ............................... 502/60, 62, 64, 502/439, 71, 77, 78, 79, 527.15, 527.12, 527.24

(56) References Cited

U.S. PATENT DOCUMENTS

| | | | | |
|---|---|---|---|---|
| 4,546,090 A | * | 10/1985 | Olson et al. .................. | 502/69 |
| 4,631,267 A | * | 12/1986 | Lachman et al. ............ | 502/439 |
| 4,657,880 A | * | 4/1987 | Lachman et al. ............. | 502/64 |
| 4,793,980 A | * | 12/1988 | Torobin .................... | 423/213.5 |
| 5,194,414 A | * | 3/1993 | Kuma ........................ | 502/80 |
| 5,232,882 A | * | 8/1993 | Yoshimoto et al. ............ | 502/5 |
| 5,330,945 A | * | 7/1994 | Beckmeyer et al. .......... | 502/66 |
| 5,387,564 A | * | 2/1995 | Takeuchi et al. .............. | 502/62 |
| 5,504,051 A | * | 4/1996 | Nakamura et al. .......... | 502/261 |
| 5,552,123 A | * | 9/1996 | Numoto et al. ............. | 422/180 |
| 5,716,899 A | * | 2/1998 | Guile et al. ................. | 502/439 |
| 5,935,897 A | * | 8/1999 | Trubenbach et al. ........ | 502/150 |
| 5,972,835 A | * | 10/1999 | Gupta ........................ | 502/439 |
| 6,004,896 A | * | 12/1999 | Addiego ..................... | 502/64 |
| 6,517,899 B1 | * | 2/2003 | Hoke et al. ............... | 427/207.1 |
| 2001/0055554 A1 | * | 12/2001 | Hoke et al. ................. | 423/210 |

* cited by examiner

*Primary Examiner*—Tom Dunn
*Assistant Examiner*—Colleen P. Cooke
(74) *Attorney, Agent, or Firm*—Oblon, Spivak, McClelland, Maier & Neustadt, P.C.

(57) ABSTRACT

The slurry for carrying zeolite of the present invention is slurry for attaching zeolite to a carrier and comprises zeolite and an organic emulsion binder dispersed in water. This slurry for carrying zeolite has viscosity not excessively high in spite of a large content of zeolite and binder and has a pH at which the zeolite and binder are stable. The slurry therefore can be stored for a long time in a stable manner.

12 Claims, No Drawings

SLURRY FOR CARRYING ZEOLITE AND METHOD FOR MANUFACTURING ZEOLITE-CARRYING ADSORPTION ELEMENT

TECHNICAL FIELD

The present invention relates to a method for manufacturing a zeolite-carrying adsorption element and slurry used for attaching zeolite to a carrier (hereinafter referred to as "slurry for carrying zeolite") used in the method of manufacturing the zeolite-carrying adsorption element. In particular, the present invention relates to a method of manufacturing the zeolite-carrying adsorption element used in an apparatus for removing organic solvent vapors by processing gases such as air containing the organic solvent vapors, and to slurry for carrying zeolite used in the method of manufacturing such a zeolite-carrying adsorption element.

BACKGROUND ART

Conventionally, an apparatus containing hydrophobic zeolite supported on a carrier to adsorb organic solvent vapors from gases, such as air containing the organic solvent vapors, has been known. For example, WO 91/16971 discloses a gas adsorption element obtained by immersing a cylindrical carrier having small permeable holes formed from silica alumina-type ceramic fibers in a slurry prepared by dispersing finely pulverized hydrophobic zeolite in a silica or alumina aqueous sol. Because the gas adsorption element contains hydrophobic zeolite carried on the surface, the element can selectively remove organic solvents from the air containing organic solvent vapors and water. Here, "hydrophobic zeolite" means zeolite containing a larger amount of $SiO_2$, which exhibits stronger hydrophobicity than ordinary zeolite and, therefore, has a larger $SiO_2/Al_2O_3$ molar ratio than ordinary zeolite. Aqueous silica sol slurry is stable when the slurry is alkaline with a pH in the range of 9–11, whereas aqueous alumina sol slurry is stable when acidic with a pH of 3–5.

The pH range for inorganic binders such as silica sol and alumina sol is narrow as indicated above. Therefore, if slurry is prepared by mixing these binders with zeolite which becomes acidic when dispersed in water, the pH of the resulting slurry is outside the range in which the inorganic binders are stable, resulting in gelation of the inorganic binders and an increase in the slurry viscosity. This causes problems such as clogging of a carrier when the carrier is impregnated with slurry, leading to impaired productivity.

The amount of zeolite to be carried on an absorption element is usually 60 kg/m$^3$ or more, which requires a large amount of zeolite (about 17.5–25 wt %) to be formulated in slurry for the amount of an organic binder (about 15.8–20 wt % on solid basis). Such slurry has a high viscosity (about 30–35 mPa.s at 20° C.) and can clog a carrier when the carrier is impregnated with the slurry, resulting in low productivity.

In addition, although zeolite can maintain a stable crystal structure in slurry in a neutral pH range, the crystal structure tends to be destroyed due to dissolution of $SiO_2$ and $Al_2O_3$ when the slurry becomes acidic or alkaline. In particular, the crystal structure is destroyed in an alkaline pH range more easily than in an acidic pH range, significantly impairing performance as an adsorption element of the product. Therefore, slurry containing zeolite and an inorganic binder must be adjusted to a pH at which either the zeolite or the inorganic binder is stable. Such slurry cannot be stored for a long period of time. In addition, $SiO_2$ is corroded by alkali more easily than $Al_2O_3$. For this reason, the crystal structure of hydrophobic zeolite is easily broken.

An object of the present invention is therefore to provide slurry for carrying zeolite which has viscosity not excessively high in spite of a large content of zeolite and binder, has a pH at which zeolite and a binder are stable, and therefore can be stored for a long time in a stable manner, and to provide a method of manufacturing a zeolite-carrying adsorption element using the slurry.

DISCLOSURE OF THE INVENTION

As a result of extensive studies, the inventor of the present invention has found that if an organic emulsion binder is used as a binder in slurry containing zeolite and a binder, the slurry may contain zeolite at a higher concentration, making it possible for zeolite to be impregnated more efficiently, can inhibit gelation of the binder, thereby allowing the slurry viscosity to be maintained in an appropriate range for a long period of time, and is almost free from pH change when a binder is added, which allows the zeolite slurry to be maintained at a pH suitable for storage of zeolite and allows the zeolite to maintain the crystal structure for a long period of time.

Specifically, the present invention provides slurry used for attaching zeolite to a carrier comprising zeolite and an organic emulsion binder dispersed in water.

The present invention further provides a method of manufacturing a zeolite-carrying adsorption element comprising causing a carrier to be impregnated with the slurry for carrying zeolite, drying the carrier, causing the carrier to be impregnated with an inorganic binder, and drying and firing the resulting carrier.

DETAILED DESCRIPTION

The slurry for carrying zeolite of the present invention comprises zeolite and an organic emulsion binder dispersed in water. Ordinary zeolite or hydrophobic zeolite having a high $SiO_2/Al_2O_3$ ratio can be used in the present invention without specific limitation. Hydrophobic zeolite, which has a high $SiO_2$ content and, therefore, is attacked by alkali and loses its crystal structure in slurry more easily than ordinary zeolite, is effectively used in the present invention which can maintain the zeolite crystal structure. Either one type of zeolite alone or a combination of two or more types of zeolite can be used in the present invention.

As an organic emulsion binder, one or more resins selected from the group consisting of (meth)acrylic resins, vinyl acetate resins, (meth)acrylic-styrene copolymer resins, styrene-butadiene copolymer resins, ethylene-vinyl acetate copolymer resins, and styrene-acrylonitrile-alkyl (meth) acrylate copolymer resins can be used in the present invention. Of these, an emulsion binder of styrene-acrylonitrile-alkyl (meth)acrylate copolymer resin is preferable due to excellent capability of attaching zeolite to inorganic fibers and the like.

The slurry for carrying zeolite of the present invention, which comprises zeolite and an organic emulsion binder dispersed in water, may further contain polyvinyl alcohol, as required. As examples of polyvinyl alcohol, PVA-117 and PVA-120 manufactured by Kuraray Co., Ltd. can be given. The addition of a surfactant such as polyvinyl alcohol is desirable because a surfactant increases zeolite attachment to carriers.

The slurry for carrying zeolite contains zeolite usually in an amount of 30–40 wt %, and preferably 33–37 wt %. The slurry containing zeolite in an amount in this range can efficiently impregnate a carrier with zeolite. Because the binder of the present invention is an organic emulsion binder, the content of zeolite in the slurry can be increased, thereby enabling zeolite to be efficiently impregnated in a carrier.

The slurry for carrying zeolite contains an organic emulsion binder usually in an amount of 3–7 wt %, and preferably 3–5 wt %, on a solid basis. The addition of an organic emulsion binder in the amount of the above range is desirable for increasing attachment of zeolite to the carrier and for improving impregnation of the carrier with zeolite.

The slurry for carrying zeolite usually has a viscosity in the range of 15–20 mPa.s, and preferably 15–17 mPa.s, at 20° C. The viscosity of the slurry for carrying zeolite in the above range is preferable to prevent the carrier from clogging when the carrier is impregnated with zeolite. In general, slurry for carrying zeolite easily clogs the carrier if the viscosity is 25 mPa.s or above. However, because the viscosity of the slurry of the present invention can be maintained in the above preferable range notwithstanding a high concentration of zeolite due to the use of an organic emulsion binder, the carrier can be efficiently impregnated with zeolite without being clogged.

The slurry for carrying zeolite has a pH in a range usually of 4–6, and preferably 5–6. The pH of the slurry for carrying zeolite in the above range is preferable to prevent the zeolite crystal structure from being destroyed, thereby ensuring the high quality of the slurry for a long period of time.

The method of manufacturing a zeolite-carrying adsorption element of the present invention comprises causing a carrier to be impregnated with the slurry for carrying zeolite, drying the carrier, causing the carrier to be impregnated with an inorganic binder, and drying and firing the resulting carrier. Honeycomb-shaped carriers formed from inorganic fiber paper can be given as an example of the carrier which can be used in the present invention. The honeycomb-shaped carriers formed from inorganic fiber paper are particularly preferable because zeolite can be impregnated thoroughly inside the fibers due to the high void of 80–95%.

As examples of inorganic fiber paper used as the carrier of the present invention, fiber papers made from ceramic fiber, glass fiber, or alumina fiber can be given. Of these, the fiber paper made from ceramic fiber is preferable because of excellent formability in a honeycomb and superior shape retentivity.

As a method of impregnating the carrier with the above-described slurry, a method of dipping the carrier in the slurry, a method of spraying the slurry onto the carrier, and the like can be given. The dipping time is usually from 10 to 20 minutes, and preferably from 10 to 15 minutes. The amount of zeolite to be attached to the carrier is usually 60 kg/m$^3$ or more, and preferably from 60 to 75 kg/m$^3$. An adsorption element in which hydrophobic zeolite is attached to the carrier in the amount of the above range can sufficiently adsorb organic solvent vapor when used in an apparatus for adsorbing organic solvent vapor from gases such as air containing the organic solvent vapors.

After being impregnated with zeolite by dipping in the slurry, the carrier is dried. Although there are no specific limitations to the drying conditions, drying conditions at a temperature of usually 100–140° C., and preferably 130–140° C., usually for 45–90 minutes, and preferably 45–60 minutes can be applied. The drying conditions of the above range are preferable to improve drying efficiency without burning organic substances.

In the method of manufacturing the zeolite-carrying adsorption element of the present invention, after attaching zeolite to the carrier by impregnating with the slurry and drying, the carrier is further impregnated with an inorganic binder not containing zeolite, followed by drying and firing. Impregnation with an inorganic binder after zeolite has been attached not only increases hardness of the carrier, but also causes the zeolite to be attached more strongly to the carrier.

As examples of inorganic binders used in the present invention, silica sol, alumina sol, titanium dioxide sol, and the like can be given. Of these, silica sol is a preferable due to its excellent capability of firmly attaching the zeolite and increasing hardness of the carrier. The inorganic binders may be used either individually or in combination of two or more.

Inorganic binders contain solid components usually in an amount of 20–30 wt %, and preferably 28–30 wt %. The solid components in the above range are preferable to increase hardness of the carrier and firmly attach the zeolite.

As a method of impregnating the carrier with the inorganic binders, the same methods as discussed in relation to the method of impregnating the carrier with slurry for carrying zeolite can be used. The dipping time is usually from 10 to 20 minutes, and preferably from 10 to 15 minutes. The amount of inorganic binder to be attached to the carrier is usually from 70 to 100 kg/m$^3$, and preferably from 90 to 100 kg/m$^3$. An amount of inorganic binder in the above range is preferable to increase hardness of the carrier and firmly attach the zeolite.

After being impregnated with the inorganic binder by dipping in slurry containing the inorganic binder, the carrier is dried. Although there are no specific limitations to the drying conditions, drying conditions at a temperature of usually 100–140° C., and preferably 130–140° C., usually for 45–90 minutes, and preferably 45–60 minutes can be applied. The drying conditions of the above range are preferable to improve drying efficiency without combusting organic substances.

The carrier is fired after drying. Although there are no specific limitations to the firing conditions, the firing conditions at a temperature of usually 450–550° C., and preferably 500–550° C. for usually 60–120 minutes, and preferably 60–90 minutes can be applied. The above firing condition is effective in completely removing all organic substances in the honeycomb carrier and producing an incombustible honeycomb carrier.

The slurry for carrying the zeolite of the present invention can be used for the manufacture of the zeolite-carrying adsorption element, for example. The zeolite-carrying adsorption element obtained by the method of the present invention can be used, for example, as a zeolite-carrying adsorption element in the apparatus for removing organic solvent vapors by processing gases such as air containing the organic solvent vapors.

EXAMPLES

The present invention will be described in more detail by examples, which should not be construed as limiting the present invention.

The acrylic binder and silica binder used in Examples and Comparative Examples are as follows:

Acrylic emulsion binder A: Styrene-acrylonitrile-alkyl acrylate copolymer emulsion binder (solid component of the resin: 50 wt %)

Acrylic emulsion binder B: Alkyl methacrylate-alkyl acrylate copolymer emulsion binder (solid component of the resin: 50 wt %)

Silica sol A: Stabilizer $NH_4^+$ (solid component: 30 wt %)

Silica sol B: Stabilizer $Na^+$ (solid component: 30 wt %)

Silica sol C: No stabilizer (solid component: 30 wt %)

Example 1

A waveform article with a wave height of 1.9 mm and a wave pitch of 3.3 mm was formed from a substrate paper consisting of paper made of inorganic fiber (thickness 0.2 mm, void 90%) and an organic binder. A honeycomb carrier was obtained by winding the waveform article.

A slurry A was obtained by homogeneously dispersing 100 parts by weight of hydrophobic zeolite $5Na_2O \cdot Al_2O_3 \cdot 5SiO_2 \cdot 9H_2O$ ($SiO_2/Al_2O_3$ molar ratio=4.8), 20 parts by weight of acrylic emulsion binder A, and 155 parts by weight of ion exchanged water. The pH of the slurry after preparation was 5.3 and the viscosity at 20° C. was 17.5 mPa.s. The composition of Slurry A is shown in Table 1, and the pH and viscosity at 20° C. after preparation are shown in Table 3.

The above honeycomb carrier was dipped in the Slurry A for 10 minutes and dried for 60 minutes at 130° C. The honeycomb carrier was then dipped in silica sol B for 10 minutes and dried for 60 minutes at 130° C. to improve the hardness of honeycomb carrier and ensure firm attachment of the zeolite. The resulting honeycomb carrier was fired for 60 minutes at 500° C. to remove organic substances, thereby obtaining a VOC (volatile organic compound) concentrate rotor of the adsorption element. The amount of zeolite attached to the adsorption element is shown in Table 2.

The pH and viscosity of the Slurry A were measured one and three months after preparation. The results are shown in Table 3.

TABLE 1

|  | Example | | | Comparative Example | | |
|---|---|---|---|---|---|---|
|  | 1 | 2 | 3 | 1 | 2 | 3 |
| Hydrophobic zeolite | 100 | 100 | 100 | 100 | 100 | 100 |
| Acrylic emulsion binder A | 20 | — | 20 | — | — | — |
| Acrylic emulsion binder B | — | 20 | — | — | — | — |
| Polyvinyl alcohol | — | — | 15 | — | — | — |
| Silica sol A | — | — | — | 300 | — | — |
| Silica sol B | — | — | — | — | 300 | — |
| Silica sol C | — | — | — | — | — | 300 |
| Ion exchanged water | 155 | 155 | 155 | 170 | 170 | 170 |
| Total (parts by weight) | 275 | 275 | 290 | 570 | 570 | 570 |
| Zeolite content (wt %) | 36 | 36 | 34 | 17.5 | 17.5 | 17.5 |
| Slurry | A | B | C | D | E | F |

* The amounts are indicated by "parts by weight" in the Table.

TABLE 2

|  | Example | | | Comparative Example | | |
|---|---|---|---|---|---|---|
|  | 1 | 2 | 3 | 1 | 2 | 3 |
| Slurry | A | B | C | D | E | F |
| The amount of zeolite attached (kg/m³) | | | | | | |
| *After the first dipping | 64.4 | 63.1 | 72.3 | 36.4 | 33.8 | 34.7 |
| *After the second dipping | —*1 | —*1 | —*1 | 29.6 | 30.1 | 26.9 |
| Total zeolite attached | 64.4 | 63.1 | 72.3 | 66.0 | 63.9 | 61.9 |

*1 Dipping for the second or subsequent time was omitted because the required amount of zeolite for the adsorption element (60 kg/m³) had been attached.

TABLE 3

|  | Example | | | Comparative Example | | |
|---|---|---|---|---|---|---|
|  | 1 | 2 | 3 | 1 | 2 | 3 |
| Slurry | A | B | C | D | E | F |
| PH | | | | | | |
| Immediately after preparation | 5.3 | 5.2 | 5.5 | 5.1 | 7.8 | 4.5 |
| One month after preparation | 5.5 | 5.3 | 5.8 | 6.7 | —*2 | —*1 |
| Three months after preparation | 5.6 | 5.5 | 5.8 | —*1 | — | — |
| Viscosity (mPa.s) | | | | | | |
| Immediately after preparation | 17.5 | 16.8 | 19.2 | 17.8 | 19.1 | 30.6 |
| One month after preparation | 17.5 | 17.1 | 19.4 | 31.3 | —*2 | —*1 |
| Three months after preparation | 17.6 | 17.1 | 19.5 | —*1 | — | — |

*1 Not measured because the slurry gelled.
*2 Not measured because the crystal structure of zeolite was found to have collapsed as a result of powder X-ray diffraction analysis. The crystal structure of zeolite was judged to have collapsed when the peak height of the zeolite was 30% or less of the original height.

Example 2

A Slurry B was prepared in the same manner as in Example 1, except for using an acrylic emulsion binder B instead of the acrylic emulsion binder A. A VOC concentrate rotor was then obtained.

The composition of the Slurry B is shown in Table 1, the amount of zeolite attached to the adsorption element is shown in Table 2, and the pH and viscosity at 20° C. are shown in Table 3.

Example 3

A Slurry C was prepared in the same manner as in Example 1, except that 15 parts by weight of polyvinyl alcohol was added. A VOC concentrate rotor was then obtained.

The composition of the Slurry C is shown in Table 1, the amount of zeolite attached to the adsorption element is shown in Table 2, and the pH and viscosity at 20° C. are shown in Table 3.

Comparative Example 1

A Slurry D shown in Table 1 was prepared in the same manner as in the preparation of Slurry A.

The same honeycomb carrier as in Example 1 was dipped in the Slurry D for 10 minutes (first impregnation) and dried at 130° C. for 60 minutes, followed by firing at 500° C. for 60 minutes to remove organic substances from the honeycomb carrier. The fired honeycomb carrier was dipped again in the Slurry D for 10 minutes (second impregnation) and dried at 130° C. for 60 minutes, thereby obtaining a VOC concentration rotor of an adsorption element. The amount of zeolite attached to the adsorption element is shown in Table 2. The change in the pH and viscosity of the Slurry D are shown in Table 3.

Comparative Example 2

A VOC concentrate rotor was obtained in the same manner as in Comparative Example 1, except for using A Slurry E instead of the Slurry D.

The composition of the Slurry E is shown in Table 1, the amount of zeolite attached to the adsorption element is shown in Table 2, and the pH and viscosity at 20° C. are shown in Table 3.

Comparative Example 3

A VOC concentrate rotor was obtained in the same manner as in Comparative Example 1, except for using A Slurry F instead of the Slurry D.

The composition of the Slurry F is shown in Table 1, the amount of zeolite attached to the adsorption element is shown in Table 2, and the pH and viscosity at 20° C. of Slurry F are shown in Table 3.

As can be seen from the results of the above Examples and Comparative Examples, in the slurry preparation experiments under the conditions in which the viscosity immediately after the preparation becomes almost identical (16–20 mPa.s), a high zeolite concentration (about 35 wt %) was achieved in Example 1-3 in which an organic binder was used, whereas the zeolite concentration was as low as 17.5 wt % in Comparative Examples 1–2 in which an organic binder was used. For this reason, only one operation for the impregnation step was sufficient for the Examples to achieve the required amount of zeolite attachment (60 kg/m$^3$ or greater), whereas this impregnation step must be implemented twice in the Comparative Examples.

Slurry causes problems such as clogging of carriers during impregnation and the like if the viscosity is 25 mPa.s or more. However, the pH and viscosity were maintained almost constant for a long period of time in the Slurry A to Slurry C in which an organic binder was used. These slurries therefore can be stored for a long period of time. In contrast, in the Slurry D of Comparative Example 1 in which silica sol was used the viscosity increased to as high as 30 mPa.s one month after the preparation. The slurry subsequently becomes a gel. This slurry therefore cannot be stored for a long period of time. In the Slurry F of Comparative Example 3 in which silica sol was used, on the other hand, the viscosity was as high as 30 mPa.s immediately after the preparation. The slurry subsequently becomes a gel. This slurry therefore cannot be used upon preparation nor it can be stored for a long period of time. The slurry E of Comparative Example 2 in which silica sol was used was weakly alkaline immediately after the preparation. The zeolite crystal structure in this slurry is destroyed one month after preparation. The slurry therefore cannot be stored for a long period of time.

INDUSTRIAL APPLICATION

The slurry for carrying zeolite of the present invention in which an organic emulsion binder is used can contain zeolite at a higher concentration, may have a pH in the range in which zeolite is stable, and is free from an increase in the viscosity by the addition of binders. Thus, the viscosity can be maintained in an appropriate range for the zeolite to be efficiently attached to the carrier. The zeolite crystal structure can be maintained without collapsing during a prolonged storage period. In addition, the slurry is free from viscosity increase during storage for a long period of time, ensuring impregnation of carriers without causing clogging.

The method of manufacturing the zeolite-carrying adsorption element of the present invention, in which the above slurry for carrying zeolite is used, can attach the amount of zeolite required for an adsorption element using only one impregnation procedure, so that the steps for dipping and impregnation operation can be reduced. In addition, because the carrier is further impregnated with an inorganic binder after impregnation with the zeolite slurry, hardness of the carrier is increased and the zeolite can be attached more firmly to the carrier. Furthermore, because the quality of the slurry can be maintained high during a prolonged storage period without almost any collapse of zeolite crystal structure, a high quality zeolite adsorption element can be manufactured using the slurry.

What is claimed is:

1. A slurry, comprising:
   a hydrophobic zeolite and an organic emulsion binder selected from the group consisting of vinyl acetate resins, (meth)acrylic-styrene copolymer resins, styrene-butadiene copolymer resins, ethylene-vinyl acetate copolymer resins and styrene-acrylonitrile-alkyl (meth)acrylate copolymer resins dispersed in water, the slurry, upon contact with a carrier, effecting support of the zeolite on the carrier.

2. The slurry according to claim 1, having a zeolite content of 30–40 wt %.

3. The slurry according to claim 1, having an organic emulsion binder content of 3–7 wt % on a dry basis.

4. The slurry according to claim 1, having a viscosity of 15–20 mPa.s at 20° C.

5. The slurry according to claim 1, having a pH of 4–6.

6. A method of manufacturing a zeolite-carrying adsorption element, comprising:
   impregnating a carrier with the slurry according to claim 1;
   drying the carrier;
   impregnating the carrier with an inorganic binder; and
   drying and firing the resulting impregnated carrier.

7. The method of manufacturing a zeolite-carrying adsorption element according to claim 6, wherein the inorganic binder is one or more binders selected from the group consisting of silica sol, alumina sol and titanium dioxide sol.

8. The method of manufacturing a zeolite-carrying adsorption element according to claim 6, wherein the carrier is a honeycomb-shaped carrier formed from inorganic fiber paper.

9. The slurry according to claim 4, wherein said viscosity ranges from 15–17 mPa.s at 20° C.

10. The slurry according to claim 5, wherein said pH ranges from 5–6.

11. The method of manufacturing a zeolite-carrying adsorption element according to claim 6, wherein drying of the carrier after impregnation with said inorganic binder is done at 100–140° C. for 45–90 min.

12. The method of manufacturing a zeolite-carrying adsorption element according to claim 6, wherein firing of the carrier after impregnation with said inorganic binder is done at 450–550° C. for 60–120 min.

* * * * *